United States Patent
Laborde et al.

(10) Patent No.: US 11,046,440 B2
(45) Date of Patent: Jun. 29, 2021

(54) AIRCRAFT CABIN ENVIRONMENTAL CONTROL SYSTEM AND METHOD AND AIRCRAFT EQUIPPED WITH SUCH CONTROL SYSTEM

(71) Applicant: LIEBHERR-AEROSPACE TOULOUSE SAS, Toulouse (FR)

(72) Inventors: Fabrice Laborde, Toulouse (FR); Cyril Vaucoret, Saint Jean (FR); Laurent Fayolle, Montrabe (FR); David Lavergne, Bouloc (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 537 days.

(21) Appl. No.: 16/016,573

(22) Filed: Jun. 23, 2018

(65) Prior Publication Data
US 2018/0370636 A1    Dec. 27, 2018

(30) Foreign Application Priority Data
Jun. 23, 2017  (FR) ....................................... 1755806

(51) Int. Cl.
*B64D 13/08* (2006.01)
*B64D 13/06* (2006.01)
*B64D 13/04* (2006.01)

(52) U.S. Cl.
CPC ............. *B64D 13/08* (2013.01); *B64D 13/04* (2013.01); *B64D 13/06* (2013.01); *B64D 2013/0618* (2013.01); *B64D 2013/0648* (2013.01); *B64D 2013/0662* (2013.01); *B64D 2013/0688* (2013.01)

(58) Field of Classification Search
CPC ........ B64D 13/08; B64D 13/04; B64D 13/06; B64D 2013/0618
See application file for complete search history.

(56) References Cited

U.S. PATENT DOCUMENTS

| 2,415,713 | A | * | 2/1947 | Talbot | B64D 13/04 244/59 |
|---|---|---|---|---|---|
| 5,014,518 | A | | 5/1991 | Thomson et al. | |
| 2002/0035838 | A1 | | 3/2002 | Sauterleute et al. | |
| 2006/0180703 | A1 | * | 8/2006 | Zielinski | F28D 7/0066 244/57 |

(Continued)

*Primary Examiner* — Justin M Benedik
(74) *Attorney, Agent, or Firm* — Steven M. Greenberg, Esq.; Shutts & Bowen LLP

(57) ABSTRACT

The invention relates to a system for environmental control of an aircraft cabin (5), comprising a device for bleeding compressed air from at least one aircraft engine; an air cycle turbine engine (20) comprising at least one supercharger (21) connected to said device for bleeding compressed air by an air bleed duct (7) and a turbine (22) connected to the cabin (5) by a cabin inlet duct (8) in order to be able to supply said cabin with air at a controlled pressure and temperature, characterised in that it further comprises: stationary blading (23) which has a variable injection cross section and is mounted on said turbine (22) of said air cycle turbine engine (20) so as to be able to modify, on command, the flow rate and/or the pressure of air supplying an air inlet of said turbine (22); and a second supercharger (22) which is mounted on said air cycle turbine engine (20) and is connected to a device for bleeding outside air and to said bleed duct.

13 Claims, 1 Drawing Sheet

(56) References Cited

U.S. PATENT DOCUMENTS

| | | | |
|---|---|---|---|
| 2011/0252823 A1 | 10/2011 | McAuliffe et al. | |
| 2014/0290287 A1* | 10/2014 | Houssaye | B64D 41/00 62/90 |
| 2016/0376021 A1* | 12/2016 | Ullyott | F02B 41/10 60/783 |
| 2017/0174348 A1* | 6/2017 | Shea | B64D 13/08 |

* cited by examiner

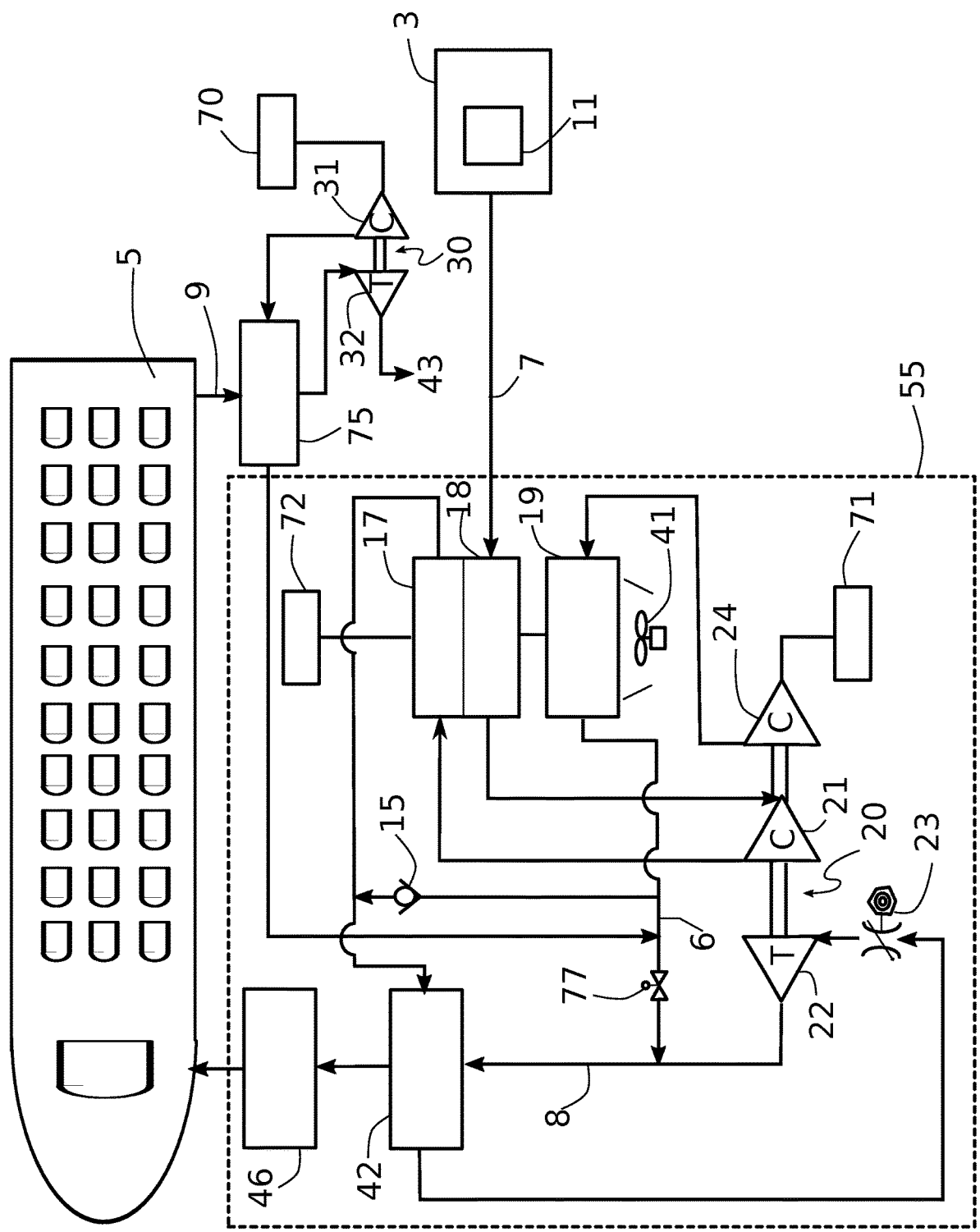

AIRCRAFT CABIN ENVIRONMENTAL CONTROL SYSTEM AND METHOD AND AIRCRAFT EQUIPPED WITH SUCH CONTROL SYSTEM

1. TECHNICAL FIELD OF THE INVENTION

The invention relates to a system and a method for environmental control of an aircraft cabin, as well as to an aircraft provided with an environmental control system of this kind.

2. TECHNICAL BACKGROUND

Throughout the text, the term "cabin" refers to any space inside an aircraft in which the pressure and/or the temperature of the air has to be controlled. This may be a passenger cabin, the cockpit, a hold and generally any region throughout the aircraft which requires air at a controlled pressure and/or temperature.

At present, environmental control of aircraft cabins is often realised by a combination of pneumatic and electric means. That said, in some aircraft the environmental control of the cabins is realised entirely by pneumatic means, i.e. solely by implementing systems that operate on the basis of air bled from the superchargers of the propulsion engines of the aircraft and ambient outside air when the aircraft is in flight, and/or on the basis of air bled from an auxiliary motor, better known as an APU.

A system of this kind for environmental control of a cabin typically includes a device for bleeding compressed air from at least one supercharger of a propulsion engine of the aircraft and an air cycle turbine engine comprising at least one supercharger and one turbine, the supercharger being supplied with air by the device for bleeding compressed air after passing through a flow rate or pressure control valve, and the turbine comprising an air outlet which supplies the cabin with a controlled temperature and flow rate. The system also includes various heat exchangers, control valves and a water extraction loop.

Throughout the text, "turbine" is used to refer to a rotary device that is intended to use the air's kinetic energy in order to rotate a shaft supporting the blades of the turbine. "Supercharger" is used to refer to a rotary device intended for increasing the pressure of the air which it receives at the inlet.

One of the difficulties of purely pneumatic solutions lies in the fact that bleeding air from the superchargers of the propulsion engines affects the energy efficiency of these engines. In particular, this bleeding of air from the superchargers of the engines substantially increases the consumption of fuel.

As such, various solutions have already been proposed in order to limit, as far as possible, this bleeding of air from the propulsion engines of the aircraft.

For example, the applicant has already proposed recovering some of the energy from the exhaust air in the cabin, which air has to be renewed in order to drive a turbine of an intermediate turbocharger that is mechanically coupled to a supercharger, which in turn is in fluid communication with the device for bleeding air from the propulsion engine. It is thus possible to limit the bleeding from the propulsion engine, in certain flight phases, and to instead use the energy from the exhaust air recovered at the outlet of the cabin in order to drive the supercharger of the turbocharger, which supplies the turbine engine of the air conditioning pack.

The inventors have sought to propose a new architecture making it possible to further limit the bleeding of air from the propulsion engines of aircraft.

3. OBJECTS OF THE INVENTION

The invention aims to provide a system for environmental control of an aircraft cabin which minimises the bleeding of air from the supercharger of the propulsion engines.

The invention also aims to provide a method for environmental control of an aircraft cabin.

The invention also aims to propose an aircraft having the same advantages. In particular, it aims to propose an aircraft in which the environmental control can be ensured exclusively by pneumatic means (it being possible for the environmental control device, in some embodiments, to be free of an electric motor) and in such a way that there is a reduced consumption of fuel.

4. DISCLOSURE OF THE INVENTION

In order to achieve this, the invention relates to a system for environmental control of an aircraft cabin, comprising:
  a device for bleeding compressed air from at least one supercharger of the aircraft engine, referred to as a device for bleeding engine air,
  an air cycle turbine engine comprising at least a first supercharger and a turbine which are mechanically coupled together, said first supercharger comprising an air inlet which is connected to said device for bleeding engine air by a duct referred to as an air bleed duct, and said turbine comprising an air outlet connected to the cabin by a duct referred to as a cabin inlet duct, in order to be able to supply the cabin with air at a controlled pressure and temperature.

A system for environmental control of an aircraft cabin according to the invention is characterised in that it further comprises:
  a blading which has a variable injection cross section and is mounted on said turbine of said air cycle turbine engine so as to be able to modify, on command, the flow rate of air supplying an air inlet of said turbine,
  a second supercharger mounted on said air cycle turbine engine and comprising an air inlet connected to a device for bleeding outside air and an outlet in fluid communication with said cabin inlet duct.

A system according to the invention therefore makes it possible to limit the disadvantages associated with bleeding air from the propulsion engine of the aircraft (mainly energy losses) by recovering some of the energy from this air that is bled from the engine.

The recovery of the energy from the air bled from the engine results from the absence of a flow rate control valve at the outlet of the device for bleeding air, this control being achieved, according to the invention, by means of blading which has a variable injection cross section and is mounted on the turbine of the air cycle turbine engine. In other words, all of the power from the air bled from the propulsion engine is guided towards the turbine of the air conditioning system and the flow rate is varied directly by a turbine having a variable injection cross section.

The recovery of this energy also makes it possible to drive a second supercharger which is mounted on the air cycle turbine engine and is used to compress air coming from a device for bleeding outside air.

Therefore, for the same output rate of the air conditioning pack, the system according to the invention makes it possible to limit the bleeding of air from the supercharger of the aircraft engine, and thus to limit the consumption of fuel.

When on the ground or in low-altitude flight phases, the second supercharger, rotated by the turbine of the air cycle turbine engine, can compress the air bled from outside the aircraft by an air scoop. This bled air is injected upstream of the air conditioning pack, for example in order to circulate in a water extraction circuit.

The combined flow of air (i.e. the flow of air bled from the supercharger of the aircraft engine and the flow of scoop air compressed by the second supercharger) is controlled by blading which has a variable injection cross section and is mounted on the turbine of the air cycle turbine engine, on the basis of flow rate measurements generated, for example, by a flow rate measurement system arranged upstream of the cabin.

Advantageously, a system according to the invention further comprises a bypass duct arranged between the outlet of the second supercharger of the air cycle turbine engine and said cabin inlet duct, which bypass duct is provided with an altitude valve designed to allow the supercharger to directly supply said cabin inlet duct when the aircraft reaches and/or exceeds a predetermined altitude.

As such, according to this advantageous variant, when at altitude, the air compressed by the second supercharger of the air cycle turbine engine is guided directly to the outlet of the air conditioning pack.

The outlet of the second supercharger is in fluid communication with the cabin inlet duct in all cases. This fluid communication with the cabin inlet duct is either direct, at altitude, or indirect, when on the ground or in low-altitude phases, after passing through the turbine.

Advantageously, a system according to the invention further comprises an intermediate turbocharger comprising a supercharger and a turbine which are mechanically coupled together, said turbine comprising an air inlet connected to said cabin by a duct, referred to as a cabin outlet duct, and said supercharger comprising an air inlet connected to a device for bleeding outside air and an air outlet connected to said cabin inlet duct by means of a heat exchanger, said heat exchanger further being in fluid communication with said cabin outlet duct.

Preferably, the heat exchanger is in fluid communication with the bypass duct, upstream of the altitude valve. Said bypass duct opens into the outlet duct.

According to this advantageous embodiment, some of the air removed from the pressurised cabin is recovered. The recovery of the energy is achieved by the presence of the intermediate turbocharger comprising at least one compression stage and at least one turbine which are mechanically coupled together. The air inlet of the turbine is connected to the cabin by a cabin outlet duct in order to recover the exhaust air removed from the cabin. The supercharger comprises an air inlet connected to a device for bleeding outside air and an air outlet connected to the cabin inlet duct by means of a heat exchanger, which in turn is in fluid communication with the cabin outlet duct.

As such, the heat exchanger makes it possible to recover the thermal energy at the outlet of the supercharger in order to increase the temperature and thus the energy at the turbine inlet. The inventors have determined that this architecture makes it possible to recover approximately 15% of additional power. In addition, this heat exchanger makes it possible to achieve an air temperature at the outlet of this energy recovery pack which is close to the temperature of the cabin, roughly by 5° C.

This energy recovery pack provides the air conditioned in this manner at the outlet of the air conditioning pack, which adjusts the motive flow rate and the bleeding of air from the second supercharger on the basis of the flow rate of said supercharger.

As such, when at altitude, the flow of scoop air compressed by the second supercharger and the flow of scoop air compressed by the supercharger of the intermediate turbocharger pass through the altitude valve and are directly injected into the cabin inlet duct and mixed with the flow of air that is bled from the supercharger of the aircraft engine and is controlled by the blading which has a variable injection cross section and is mounted on the turbine of the air cycle turbine engine.

Advantageously and according to this advantageous variant, the system further comprises a heat exchanger in fluid communication with said air bleed duct and a duct for supplying the turbine of the intermediate turbocharger.

This advantageous variant makes it possible to recycle the temperature of the air bled from the aircraft engine in the expansion turbine of the intermediate turbocharger in the interest of the cabin compression, all the while reducing the need to pre-cool the air bled from the engine before injection into the air conditioning pack.

Advantageously and according to the invention, said outlet of the supercharger of the air cycle turbine engine is connected to the inlet of said turbine by means of at least one heat exchanger, which in turn is in fluid communication with a dynamic outside air scoop.

This makes it possible to cool the compressed and reheated air provided by the supercharger before being introduced into the air inlet of the turbine of the air cycle turbine engine.

Advantageously and according to the invention, said air bleed duct is provided with at least one heat exchanger in fluid communication with a dynamic outside air scoop.

According to this advantageous embodiment, an air/air cooling heat exchanger is arranged on the bleed duct upstream of the air inlet in the supercharger of the air cycle turbine engine. Dynamic-pressure air coming from an air scoop, known as a ram-air scoop, also passes through this exchanger so as to cool the air before it enters the supercharger. Said heat exchanger makes it possible to transfer heat between a first flow of air circulating in the air bleed duct as far as the inlet of the supercharger, and a second circuit formed by a flow of air circulating between the ram-air scoop and the inlet of the supercharger.

Advantageously, a system according to the invention comprises an electric fan designed to be able to ensure the circulation of air through said heat exchangers.

According to this variant, the circulation of air in the heat exchangers is ensured by an electric fan, which makes it possible to maintain the maximum pneumatic energy for compressing the outside air coming from the device for bleeding outside air. In particular, in prior art systems, the circulation of air in the exchangers is ensured by a fan wheel mounted on the shaft of the air cycle turbine engine. According to this variant, the invention makes it possible to release the shaft of the turbine engine, and thus to use the recovered mechanical energy in order, in particular, to drive the second supercharger.

The air coming from the cabin may be recirculated air. In this case, the outlet of the turbine of the intermediate turbocharger is connected to the inlet of the cabin or to a mixing chamber.

Advantageously and according to the invention, the air outlet of the turbine of the turbocharger is connected to an air outlet outside the aircraft so as to release the expanded air outside.

According to this variant, the air outlet of the turbine of the intermediate turbocharger is connected to an air outlet outside the aircraft so as to be able to remove the expanded air outside. In this case, at least some of the air to be removed from the cabin for renewing the air is used to drive the turbine of the intermediate turbocharger.

Advantageously and according to the invention, said turbocharger is a turbocharger having two parallel turbine stages.

The invention also relates to a method for environmental control of an aircraft cabin, comprising:
- bleeding compressed air from at least one supercharger of the aircraft engine by means of a device for bleeding air,
- guiding, by means of a bleed duct, this bled air to an inlet of a supercharger of an air cycle turbine engine which is mechanically coupled to a turbine,
- guiding the air at the outlet of the turbine to said cabin by means of a cabin inlet duct, said air being supplied at a controlled pressure and temperature.

A method according to the invention is characterised in that it comprises:
- controlling the flow rate of air supplying said turbine of the turbine engine by means of blading which has a variable injection cross section and is mounted on said turbine of said turbine engine so as to be able to modify, on command, the flow rate of air supplying an air inlet of said turbine,
- guiding air bled by a device for bleeding outside air to an inlet of a second supercharger which is mounted on said turbine engine and of which one outlet is in fluid communication with said cabin inlet duct.

Advantageously, a method according to the invention further comprises directly guiding air at the outlet of the second supercharger to said cabin inlet duct by means of a bypass duct provided with an altitude valve designed to make it possible for the supercharger to directly supply said cabin inlet duct when the aircraft reaches a predetermined altitude.

Advantageously, a method according to the invention further comprises:
- guiding the air at the outlet of the cabin, by means of a cabin inlet duct, to an air inlet of a turbine of a turbocharger which is mechanically coupled to a supercharger,
- guiding air bled by a device for bleeding outside air to an inlet of the supercharger,
- guiding the air at the outlet of the supercharger to said cabin inlet duct by means of a heat exchanger, said heat exchanger being in fluid communication with said cabin outlet duct.

Preferably, the heat exchanger is in fluid communication with the bypass duct, upstream of the altitude valve. Said bypass duct opens into the outlet duct.

A system according to the invention advantageously implements a method according to the invention, and a method according to the invention is advantageously implemented by a system according to the invention.

The invention also relates to an aircraft comprising at least one propulsion engine and a cabin, characterised in that it comprises a system for environmental control of this cabin according to the invention.

The invention also relates to an environmental control system, to an environmental control method and to an aircraft, characterised in combination by all or some of the features mentioned above or below.

5. LIST OF FIGURES

Other aims, features and advantages of the invention will emerge from reading the following description, which is given purely by way of non-limiting example and relates to the accompanying FIG. 1, which is a schematic view of one embodiment of an environmental control system according to the invention which implements an environmental control method according to the invention in an aircraft according to the invention.

6. DETAILED DESCRIPTION OF AN EMBODIMENT OF THE INVENTION

An aircraft according to the invention comprises, as shown schematically in FIG. 1, a passenger cabin 5 and at least one main engine 3. Said main engine 3, which is dedicated to the propulsion of the aircraft, comprises for example a supercharger 11 and a turbine (not shown in FIG. 1).

The environmental control system according to the invention comprises at least one air conditioning pack 55, known under the acronym ECS. Said conditioning pack 55 can have various embodiments. The embodiment shown in FIG. 1 is schematic and comprises an air cycle turbine engine 20, three heat exchangers 17, 18, 19 in fluid communication with a dynamic-air circulation channel (known as ram) and a water extraction loop 42, which is not shown in detail for the sake of clarity.

The air conditioning pack 55 is supplied with air bled from the supercharger 11 of the engine 3 by means of an air bleed duct 7, and the pack 55 supplies the cabin 5 by means of a cabin inlet duct 8.

The air cycle turbine engine 20 comprises at least one rotary supercharger 21 and one rotary turbine 22 which are mechanically coupled together. The supercharger 21 and the turbine 22 each comprise an air inlet and an air outlet.

A first circuit of an air/air heat exchanger 17 is positioned between the outlet of the supercharger 21 and the inlet of the turbine 22 so as to be able to cool the compressed and reheated air supplied by the supercharger 21 before said air is introduced into the air inlet of the turbine 22. Downstream of the heat exchanger 17, the cooled flow of compressed air passes into a water extraction loop 42. Said water extraction loop 42 comprises for example a heater formed by an air/air heat exchanger, a condenser also formed by an air/air heat exchanger and a water extractor. The cold air expanded at the outlet of the turbine 22 passes through the condenser of the water extraction loop 42 in order to the cool the air flow upstream of the turbine 22, then supplies a mixing chamber 46 which is connected to the cabin 5.

The heat exchanger 17 comprises a second circuit through which dynamic-pressure air coming from at least one air bleed opening 72 passes in order to cool the compressed and reheated air between the supercharger 21 and the turbine 22.

Furthermore, a first circuit of an air/air cooling heat exchanger 18 is positioned between the inlet of the air conditioning system 55 and the air inlet of the supercharger 21. Dynamic-pressure air coming from the air bleed opening 72 passes through the second circuit of said heat exchanger 18.

Finally, a first circuit of an air/air cooling heat exchanger 19 is positioned between the air outlet of a second supercharger 24 which is mounted on the air cycle turbine engine 20 and supplied with air by a device 71 for bleeding outside air, and the cabin inlet duct 8. Dynamic-pressure air coming from the air bleed opening 72 passes through the second circuit of said heat exchanger 19.

As described below, the air cooled by said heat exchanger 19 is either injected directly into the cabin inlet duct 8 in flight phases at altitude, or is injected into the cabin inlet duct 8 after passing through the water extraction loop 42 and the turbine 22.

The circulation of air in the second circuits of the heat exchangers 17, 18 and 19 is ensured by an electric fan 41.

A system according to the invention is characterised in that it comprises blading 23 which has a variable injection cross section and is mounted on the turbine 22 of the air cycle turbine engine 20 so as to be able to modify, on command, the flow rate of air supplying an air inlet of said turbine 22. Said blading 23 which has a variable cross section can be of any known type. Blading of this kind is designed to modify the cross section of the flow of air in the turbine 22 and therefore to modify the flow rate of air at the inlet of the turbine 22.

Blading of this kind comprises for example two air-guiding surfaces which are arranged relative to one another so as to form an air-injection passage therebetween for supplying mobile blading of the turbine. Said blading also comprises a plurality of blades that are positioned between the two guiding surfaces in said injection passage and are arranged so as to form, between one another in pairs and between the two guiding surfaces, in the injection passage, a plurality of channels, each blade being rotatably mounted about an axis of rotation intersecting the guiding surfaces, such that modifying the angular position of a blade leads to a modification of the geometric features of each channel delimited by this blade, and a mechanism for controlling the angular position of the blades.

A system according to the invention also comprises a bypass duct 6 arranged between the outlet of the second supercharger 24 of the air cycle turbine engine 20 and the cabin inlet duct 8. Said bypass duct 6 is provided with an altitude valve 77 designed to allow the supercharger to directly supply the cabin inlet duct 8 when the aircraft reaches a predetermined altitude. A non-return valve 15 makes it possible to control the circuit on the basis of the flight. When at altitude, the air compressed by the supercharger 24 is conveyed directly by the bypass duct 6 to the cabin inlet duct 8, and when on the ground or at low altitude, the air passes through the non-return valve 15 and reaches the water extraction loop 42 and the turbine 15.

The system according to the embodiment in the FIGURE also comprises an intermediate turbocharger 30 comprising a supercharger 31 and a turbine 32 which are mechanically coupled together. Said intermediate turbocharger aims to recover some of the energy from the exhaust air expelled from the cabin 5.

In order to achieve this, the turbine 32 comprises an air inlet connected to the cabin 5 by means of a cabin outlet duct 9, and the supercharger 31 comprises an air inlet connected to a device 70 for bleeding outside air and an air outlet connected to the cabin inlet duct 8 by means of a heat exchanger 75. Said heat exchanger 75, better known as an intercooler, is in fluid communication with the cabin outlet duct 9.

According to this architecture, the air recovered from the cabin is initially used to cool the flow of air compressed by the supercharger 31. The heat exchanger 75 makes it possible to automatically stabilise the temperature of the air compressed by the supercharger 31.

The flow of air is then injected into the air conditioning pack, upstream of the altitude valve 77 of the bypass duct 6.

As such, according to this embodiment, when the pressurisation conditions of the cabin 5 allow it, some of the energy from the air expelled from the cabin 5 is recovered for the benefit of the air conditioning system.

A control system according to the invention further comprises control logic which is associated with control valves and devices (not shown in the drawings) and makes it possible to adapt the bleeding of air from the various elements on the basis of cabin pressurisation aims.

The invention claimed is:

1. A system for environmental control of an aircraft cabin (5), comprising:
    a device for bleeding compressed air from at least one supercharger (11) of an aircraft engine (3),
    an air cycle turbine engine (20) comprising at least one supercharger (21), and a turbine (22) which are mechanically coupled together, a first air cycle engine supercharger (21) comprising an air inlet connected to said device for bleeding compressed air from at least one aircraft ermine supercharger (11) by means of a duct referred to as a bleed duct (7), and said turbine (22) comprising an air outlet connected to the cabin (5) by a duct referred to as a cabin inlet duct (8), in order to be able to supply the cabin (5) with air at a controlled pressure and temperature,
characterised in that it further comprises:
    a blading (23) which has a variable injection cross section and is mounted on said turbine (22) of said air cycle turbine engine (20) so as to be able to modify, on command, the flow rate of air supplying an air inlet of said turbine (22),
    a second air cycle engine supercharger (24) mounted on said air cycle turbine engine (20) and comprising an air inlet connected to a device (71) for bleeding outside air and an outlet in fluid communication with said cabin inlet duct (8).

2. The system according to claim 1, characterised in that it further comprises a bypass duct (6) arranged between the outlet of the second air cycle engine supercharger (24) of the air cycle turbine engine (20) and said cabin inlet duct (8), which bypass duct is provided with an altitude valve (77) designed to allow the second air cycle engine supercharger to directly supply said cabin inlet duct when said cabin inlet duct (8) reaches a predetermined altitude.

3. The system according to claim 1, characterised in that it further comprises an intermediate turbocharger (30) an intermediate supercharger (31) and a turbine (32) which are mechanically coupled together, said turbine (32) comprising an air inlet connected to the cabin (5) by a duct, referred to as a cabin outlet duct (9), and said intermediate supercharger (31) comprising an air inlet connected to a device (70) for bleeding outside air and an air outlet connected to said cabin inlet duct (8) by means of a heat exchanger (75), said heat exchanger (75) further being in fluid communication with said cabin outlet duct (9).

4. The system according to claim 3, characterised in that said air outlet of the turbine (32) of the turbocharger (30) is connected to an air outlet (43) outside the aircraft so as to release the expanded air outside.

5. The system according to claim 3, characterised in that said turbocharger (30) is a turbocharger having two parallel turbine stages.

6. The system according to claim 3, characterised in that it further comprises a heat exchanger in fluid communication with said air bleed duct and a duct for supplying the turbine of the intermediate turbocharger.

7. The system according to claim 1, characterised in that said outlet of the air cycle engine supercharger (21) of the air cycle turbine engine (20) is connected to the inlet of said turbine (22) by means of at least one heat exchanger (19), which in turn is in fluid communication with a dynamic outside air scoop (72).

8. The system according to claim 1, characterised in that said air bleed duct (7) is provided with at least one heat exchanger (18) in fluid communication with a dynamic outside air scoop (72).

9. The system according to claim 7, characterised in that it further comprises an electric fan (41) designed to be able to ensure the circulation of air through said heat exchangers (17, 18, 19).

10. A method for environmental control of an aircraft cabin (5), comprising:
    bleeding compressed air from at least one supercharger (11) of an aircraft engine by means of a device for bleeding air,
    guiding, by means of a bleed duct (7), this bled air to an inlet of a supercharger (21) of an air cycle turbine engine (20) which is mechanically coupled to a turbine (22),
    guiding the air at an outlet of the turbine (22) to said cabin (5) by means of a cabin inlet duct (8), said air being supplied at a controlled pressure and temperature,
characterised in that it further comprises:
    controlling the flow rate of air supplying said turbine (22) of the turbine engine (20) by means of stationary blading (23) which has a variable injection cross section and is mounted on said turbine (22) of said turbine engine (20) so as to be able to modify, on command, the flow rate of air supplying an air inlet of said turbine (22),
    guiding air bled by a device (71) for bleeding outside air to an inlet of a second supercharger (22) of the air-cycle engine which is mounted on said turbine engine (20) and of which one outlet is in fluid communication with said cabin inlet duct.

11. The method according to claim 10, characterised in that it further comprises directly guiding the air at the outlet of the second air-cycle engine supercharger (22) to said cabin inlet duct (8) by means of a bypass duct (6) provided with an altitude valve (77) designed to allow the second air-cycle engine supercharger to directly supply said cabin inlet duct (8) when the aircraft reaches a predetermined altitude.

12. The method according to claim 10, characterised in that it further comprises:
    guiding the air at the an outlet of the cabin, by means of a cabin outlet duct (9), to an air inlet of a turbine (32) of a turbocharger (30) which is mechanically coupled to an intermediate supercharger (31),
    guiding air bled by a device for bleeding outside air to an inlet of the the intermediate supercharger (31),
    guiding the air at the an outlet of the intermediate supercharger (31) to said cabin inlet duct (8) by means of a heat exchanger (75), said heat exchanger (75) being in fluid communication with said cabin outlet duct (9).

13. An aircraft comprising at least one propulsion engine and a cabin, characterised in that it comprises a system for environmental control of said cabin according to any of claims 1 to 9.

* * * * *